United States Patent
Jung et al.

(10) Patent No.: US 7,376,074 B2
(45) Date of Patent: May 20, 2008

(54) APPARATUS AND METHOD FOR TRANSMITTING AND RECEIVING SIDE INFORMATION OF A PARTIAL TRANSMIT SEQUENCE IN AN OFDM COMMUNICATION SYSTEM

(75) Inventors: Ki-Ho Jung, Seoul (KR); Heung-Gyooun Ryu, Chongju-shi (KR); Sung-Ryul Yun, Chungchongbuk-do (KR)

(73) Assignee: Samsung Electronics Co., Ltd (KR)

( * ) Notice: Subject to any disclaimer, the term of this patent is extended or adjusted under 35 U.S.C. 154(b) by 971 days.

(21) Appl. No.: 10/423,560

(22) Filed: Apr. 25, 2003

(65) Prior Publication Data

US 2003/0202460 A1 Oct. 30, 2003

(30) Foreign Application Priority Data

Apr. 26, 2002 (KR) ............... 10-2002-0022944

(51) Int. Cl.
  *H04J 11/00* (2006.01)
(52) U.S. Cl. ............... 370/208; 370/210
(58) Field of Classification Search ......... 370/203–215
  See application file for complete search history.

(56) References Cited

U.S. PATENT DOCUMENTS 7,028,246 B2 * 4/2006 Kim et al. ............ 714/784

FOREIGN PATENT DOCUMENTS

| EP | 0 859 494 | 8/1998 |
|---|---|---|
| JP | 10-084329 | 3/1998 |
| JP | 10-303848 | 11/1998 |
| WO | WO 98/10567 | 3/1998 |

OTHER PUBLICATIONS

Shousheng He et al., VLSI Computation of the Partial DFT for (de)modulation in Multi-Channel OFDM System, 1995 IEEE, pp. 1257-1261.
Shousheng He et al., Computing Partial DFT for Comb Spectrum Evaluation, IEEE Signal Processing Letters, vol. 3, No. 6, Jun. 1996, PP. 173-175.
Leonard J. Cimini, Jr. et al., Peak-to-Average Power Ratio Reduction of an OFDM Signal Using Partial Transmit Sequences, IEEE Communications Letters, vol. 4, No. 3, Mar. 2000, pp. 86-88.
Nachrichtentechnik, A Novel Peak Power Reduction Scheme for OFDM, 1997 IEEE, pp. 1090-1094.

* cited by examiner

*Primary Examiner*—Brenda Pham
(74) *Attorney, Agent, or Firm*—The Farrell Law Firm, PC

(57) ABSTRACT

An OFDM (Orthogonal Frequency Division Multiplexing) communication system that multiplexes data with a plurality of orthogonal sub-carrier frequencies, which includes a transmitter for converting a serial data stream into parallel data, and segmenting the parallel data into a plurality of blocks having a plurality of data blocks; inserting reference data having information representing a phase value and a position into which the reference symbol is inserted, into each of the segmented blocks; IFFT (Inverse Fast Fourier Transform)-transforming the respective blocks into time-based signals where sub-carrier frequencies are separately assigned to the data blocks; and determining phase factors of the IFFT-transformed time-based signals to reduce a peak-to-average power ratio (PAPR) where non-linear distortion occurs due to coincidence of phases of the data blocks IFFT-transformed with the sub-carrier frequencies, and phase-rotating the IFFT-transformed signals according to the determined phase factors before transmission.

22 Claims, 12 Drawing Sheets

APPARATUS AND METHOD FOR TRANSMITTING AND RECEIVING SIDE INFORMATION OF A PARTIAL TRANSMIT SEQUENCE IN AN OFDM COMMUNICATION SYSTEM

PRIORITY

This application claims priority under 35 U.S.C. § 119 to an application entitled "Apparatus and Method for Transmitting and Receiving Side Information of Partial Transmit Sequence in an OFDM Communication System" filed in the Korean Intellectual Property Office on Apr. 26, 2002 and assigned Serial No. 2002-22944, the contents of which are incorporated herein by reference.

BACKGROUND OF THE INVENTION

1. Field of the Invention

The present invention relates generally to an orthogonal frequency division multiplexing (OFDM) communication system, and in particular, to an apparatus and method for transmitting and receiving side information in a partial transmit sequence (PTS) scheme.

2. Description of the Related Art

OFDM technology has high spectrum efficiency because spectra of sub-channels overlap with each other while maintaining orthogonality. According to the OFDM technology, input information symbols are modulated by inverse fast Fourier transform (hereinafter referred to as "IFFT"), while the IFFT-modulated signal is demodulated by fast Fourier transform (hereinafter referred to as "FFT").

A brief description will now be made regarding operations of a transmitter and a receiver in a mobile communication system employing the OFDM technology (hereinafter referred to as "OFDM mobile communication system").

In an OFDM transmitter, input data is modulated with a sub-carrier through a scrambler, a coder, and an interleaver. The transmitter provides a variable data rate, and applies a different coding rate, interleaving size, and modulation scheme according to the data rate. Commonly, the coder uses a coding rate of ½ or ¾, and the interleaving size for preventing a burst error is determined according to the number of coded bits per OFDM symbol (NCBPS). QPSK (Quadrature Phase Shift Keying), 8PSK (8-ary Phase Shift Keying), 16QAM (16-ary Quadrature Amplitude Modulation), and 64QAM (64-ary QAM) are used as the modulation scheme. A signal modulated with a predetermined number of sub-carriers by the elements stated above is summed up with a predetermined number of pilot sub-carriers, and then subjected to IFFT, thereby forming one OFDM signal. A guard interval for eliminating inter-symbol interference in a multi-path channel environment is inserted into the OFDM signal, and the guard interval-inserted OFDM signal is transmitted over a radio channel by a radio frequency (RF) processor, after passing through a symbol waveform generator.

In an OFDM receiver corresponding to the above-described transmitter, a reverse operation of the transmitter is performed and a synchronization process is added. First, a process of estimating a frequency offset and a symbol offset using a predetermined training symbol must be preferentially performed. Thereafter, a guard interval-eliminated data symbol is restored with a predetermined number of sub-carriers with which a predetermined number of pilot sub-carriers were summed up, through FFT. In order to cope with propagation delay in a radio channel environment, an equalizer eliminates signal distortion due to a channel from a received signal by estimating a channel condition. Data, a channel response of which was compensated through the equalizer, is converted into a bit stream and then deinterleaved by a deinterleaver. Thereafter, the deinterleaved data is restored into final data through a decoder for error correction and a descrambler.

The OFDM technology performs low-speed parallel transmission using a plurality of carriers instead of transmitting input data at high speed with a single carrier. That is, the OFDM technology is characterized in that it can realize a modulation/demodulation unit with an efficient digital device and is less susceptible to frequency selective fading or narrowband interference. Due to the characteristics stated above, OFDM technology is effective for the current European digital broadcasting transmission and high-speed data transmission adopted as the standard specification for a high-capacity mobile communication system, such as IEEE 802.11a, IEEE 802.16a, and IEEE 802.16b.

The OFDM mobile communication system transmits data with a plurality of sub-carriers, so an amplitude level of an OFDM signal can be represented by the sum of amplitude levels of the multiple sub-carriers. However, when a phase of each of the sub-carriers is changed without maintaining orthogonality, a phase of a particular sub-carrier may coincide with a phase of another sub-carrier. When phases of the sub-carriers are the same, an OFDM signal has a very high peak-to-average power ratio (hereinafter referred to as "PAPR"). An OFDM signal having a high PAPR reduces efficiency of a high-power linear amplifier and shifts an operating point of the high-power linear amplifier to a non-linear region, thereby causing inter-modulation distortion and spread spectrum between sub-carriers. In the OFDM communication system, the PAPR is a very important factor that affects communication performance. Therefore, a great amount of research has been conducted on a scheme for reducing the PAPR.

As a scheme for reducing PAPR in an OFDM communication system, there are provided a clipping scheme, a block coding scheme, and a phase rotation scheme. The clipping scheme, the block coding scheme, and the phase rotation scheme will be described herein below.

(1) Clipping Scheme

In the clipping scheme, if a level of a signal exceeds a predetermined threshold value, the level is forcibly clipped to the threshold value, thereby reducing PAPR. However, as a result, in-band distortion occurs due to non-linear operation, causing an increase in a bit error rate (hereinafter referred to as "BER"), and adjacent channel interference occurs due to out-band clipping noise.

(2) Block Coding Scheme

The block coding scheme codes surplus carriers and transmits the coded carriers to decrease PAPR of the whole carrier signal. The block coding scheme cannot only correct an error due to coding, but also decreases PAPR without distorting a signal. However, an increase in the number of the sub-carriers causes a drastic decrease in spectrum efficiency and an increase in the size of a look-up table or a generation matrix, disadvantageously increasing complexity and calculations.

(3) Phase Rotation Scheme

The phase rotation scheme is classified into a selective mapping (hereinafter referred to as "SLM") scheme and a partial transmit sequence (hereinafter referred to as "PTS") scheme. The SLM scheme multiplies each of M same data blocks by each of different phase sequences of length N, which are statistically independent of one another, selects a result having the lowest PAPR (i.e., a phase sequence having the lowest PAPR), and transmits the selected phase sequence. The SLM scheme is disadvantageous in that it requires M IFFT operations. However, the SLM scheme can considerably decrease PAPR and can be applied regardless of the number of sub-carriers.

Unlike the SLM scheme, the PTS scheme divides input data into M sub-blocks, performs L-point IFFT on each sub-block, multiplies each IFFT-transformed sub-block by a phase factor to minimize PAPR, and then sums the resultant sub-blocks before transmission. The PTS scheme is superior to the SLM scheme in terms of PAPR reduction, and is considered as the most effective and flexible scheme for reducing PAPR without non-linear distortion.

With reference to FIG. 1, a description will now be made of a transmitter for an OFDM communication system employing the PTS scheme (hereinafter referred to as "PTS-OFDM communication system").

FIG. 1 illustrates an internal structure of a transmitter for a conventional OFDM communication system employing a PTS scheme. As illustrated in FIG. 1, a transmitter 100 for the PTS-OFDM communication system includes a mapper 110, a serial-to-parallel (S/P) converter 120, a sub-block segmentation unit 130, a plurality of IFFT units 140, 142, 144, and 146, a phase factor determiner 150, a plurality of multipliers 160, 162, 164, and 166, and a combiner 170.

Referring to FIG. 1, information bits to be transmitted are first coded at a predetermined coding rate, and coded bits generated by the coding are interleaved and then provided to the mapper 110 as input data X. Although various coding schemes have been proposed, a turbo coding scheme using a turbo code, which is an error correction code, is typically used as the coding scheme. The predetermined coding rate includes ½ and ¾.

The mapper 110 maps the input data X to a corresponding modulation symbol according to a predetermined modulation scheme, and the S/P converter 120 provides the modulation symbols sequentially output from the mapper 110 to L parallel lines, where L represents the number of taps of the IFFT units 140 to 146. The sub-block segmentation unit 130 segments modulation symbols output in parallel from the S/P converter 120 into M sub-blocks $X^{(1)}$ to $X^{(M)}$ having the same length N (L=N×M). It is assumed herein that the S/P converter 120 and the sub-block segmentation unit 130 are separately provided. Of course, however, the S/P converter 120 can be removed, and instead, the sub-block segmentation unit 130 can include a function of the S/P converter 120. In this case, the sub-block segmentation unit 130 segments L symbols sequentially provided from the mapper 110 into M sub-blocks having a length N.

A sub-block conversion operation of the sub-block segmentation unit 130 will be described with reference to FIGS. 2 to 4. FIG. 2 illustrates sub-blocks segmented according to an adjacent sub-block segmentation scheme, FIG. 3 illustrates sub-blocks segmented according to an interleaved sub-block segmentation scheme, and FIG. 4 illustrates sub-blocks segmented according to a pseudo random sub-block segmentation scheme. In all of the sub-block segmentation schemes, sub-blocks must be segmented so that each sub-block should not overlap with other sub-blocks.

A description will now be made of the sub-block segmentation schemes.

(1) Adjacent Sub-Block Segmentation Scheme

The adjacent sub-block segmentation scheme segments modulation symbols of length L into sub-blocks by the sequentially adjacent modulation symbols. As illustrated in FIG. 2, if the length L is 12, the adjacent sub-block segmentation scheme segments the modulation symbols of length 12 into 4 sub-blocks by the 3 sequentially adjacent modulation symbols.

(2) Interleaved Sub-Block Segmentation Scheme

The interleaved sub-block segmentation scheme segments modulation symbols of length L into sub-blocks by interleaving. As illustrated in FIG. 3, if the length L is 12, the interleaved sub-block segmentation scheme segments the modulation symbols of length 12 into a total of 4 sub-blocks by combining 3 modulation symbols at periods of 4 modulation symbols.

(3) Pseudo Random Sub-Block Segmentation Scheme

The pseudo random sub-block segmentation scheme segments modulation symbols of length L into sub-blocks by pseudo-randomly selecting the modulation symbols. As illustrated in FIG. 4, if the length L is 12, the pseudo random sub-block segmentation scheme segments the modulation symbols of length 12 into a total of 4 sub-blocks by randomly combining 3 modulation symbols without any rule or pattern.

In FIGS. 2 to 4, in each of sub-blocks segmented by the sub-block segmentation unit 130, all other symbols than the L symbols located in the determined positions are all replaced with 0.

The IFFT units 140 to 146 perform IFFT on each of the segmented sub-blocks and generate IFFT-transformed sub-blocks $x^{(1)}$ to $x^{(M)}$. The phase factor determiner 150 receives the IFFT-transformed sub-blocks $x^{(1)}$ to $x^{(M)}$ and determines phase factors $b^{(1)}$ to $b^{(M)}$ in such a way that phases of the sub-blocks should be different than one another, in order to minimize PAPR when the sub-blocks $x^{(1)}$ to $x^{(M)}$ are summed. Next, the phase factors are matched with their corresponding sub-blocks. That is, the phase factor $b^{(1)}$ is matched with the sub-block $x^{(1)}$. In this manner, the phase factor $b^{(M)}$ is matched with the sub-block $x^{(M)}$. The multipliers 160 to 166 multiply the IFFT-transformed sub-blocks $x^{(1)}$ to $x^{(M)}$ by the corresponding phase factors $b^{(1)}$ to $b^{(M)}$, and provide their outputs to the combiner 170. The combiner 170 generates an OFDM signal $\tilde{x}$ by combining (or summing) the outputs of the multipliers 160 to 166.

As described above, the PTS scheme can effectively reduce PAPR without distorting a sub-channel spectrum and can be applied regardless of a digital modulation scheme. However, in order to enable a receiver to restore (or decode) information data, side information for a phase factor for phase rotation must be transmitted along with the data. Therefore, in order to realize the PTS scheme in an OFDM communication system, a method for effectively transmitting the side information is required.

SUMMARY OF THE INVENTION

It is, therefore, an object of the present invention to provide an apparatus and method for minimizing PAPR in an OFDM communication system.

It is another object of the present invention to provide an apparatus and method for minimizing PAPR by using a PTS scheme in an OFDM communication system.

It is further another object of the present invention to provide an apparatus and method for transmitting side information for a phase factor used for phase rotation when minimizing PAPR by using a PTS scheme in an OFDM communication system.

It is yet another object of the present invention to provide an apparatus and method for receiving side information for a phase factor used for phase rotation when minimizing PAPR by using a PTS scheme in an OFDM communication system.

It is still another object of the present invention to provide an apparatus and method for restoring information data by receiving side information for a phase factor used for phase rotation when minimizing PAPR by using a PTS scheme in an OFDM communication system.

To achieve the above and other objects, there is provided a transmission apparatus for an orthogonal frequency division multiplexing (OFDM) communication system that multiplexes data with a plurality of orthogonal sub-carrier frequencies. The apparatus comprises a sub-block segmentation unit for segmenting parallel data generated by parallel-converting a serial data stream, into a plurality of sub-blocks having a plurality of data blocks; a reference symbol inserter for inserting a reference symbol having information representing a phase value and a position into which the reference symbol is inserted, into each of the segmented sub-blocks; a plurality of inverse fast Fourier transform (IFFT) units for independently IFFT-transforming the sub-blocks into time-base signals where sub-carrier frequencies are separately assigned to the data blocks; a plurality of multipliers for separately multiplying the IFFT-transformed signals by predetermined associated phase factors; and a combiner for combining outputs of the multipliers and transmitting the combined result.

To achieve the above and other objects, there is provided a reception apparatus for an orthogonal frequency division multiplexing (OFDM) communication system that multiplexes data with a plurality of orthogonal sub-carrier frequencies before transmission. The apparatus comprises a fast Fourier transform (FFT) unit for FFT-transforming parallel data blocks generated by parallel-converting a received signal; a sub-block segmentation unit for segmenting an output of the FFT unit into a plurality of sub-blocks; a plurality of reference symbol detectors for detecting reference symbols inserted by a transmitter, from the segmented sub-blocks; a plurality of inverse phase rotation units for phase-rotating the sub-blocks according to phase values of the detected reference symbols; a plurality of reference symbol eliminators for eliminating the reference symbols from outputs of the inverse phase rotation units; and a combiner for combining outputs of the reference symbol eliminators.

To achieve the above and other objects, there is provided a transmission method for an orthogonal frequency division multiplexing (OFDM) communication system that multiplexes data with a plurality of orthogonal sub-carrier frequencies. The method comprises the steps of converting a serial data stream into parallel data; segmenting the parallel data into a plurality of blocks having a plurality of data blocks; IFFT (Inverse Fast Fourier Transform)-transforming the blocks into time-based signals where sub-carrier frequencies are separately assigned to the data blocks; and determining phase factors of the IFFT-transformed time-based signals to reduce a peak-to-average power ratio (PAPR) where non-linear distortion occurs due to coincidence of phases of the data blocks IFFT-transformed with the sub-carrier frequencies. Reference data having information representing a phase value and a position into which the reference data is inserted, is inserted into each sub-block between the segmentation step and the IFFT transforming step.

To achieve the above and other objects, there is provided a reception method for an orthogonal frequency division multiplexing (OFDM) communication system that multiplexes data with a plurality of orthogonal sub-carrier frequencies. The method comprises the steps of parallel-converting a received signal into parallel data; FFT (Fast Fourier Transform)-transforming the parallel data; segmenting the FFT-transformed data into a plurality of sub-blocks; inverse-phase-rotating the sub-blocks according to predetermined phase values; detecting reference data having information representing a phase value and a position into which the reference data is inserted, the reference data being inserted by a transmitter into each of the blocks, between the segmentation step and the IFFT transforming step; and eliminating the reference data from each of the inverse-phase-rotated sub-blocks according to the phase value.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
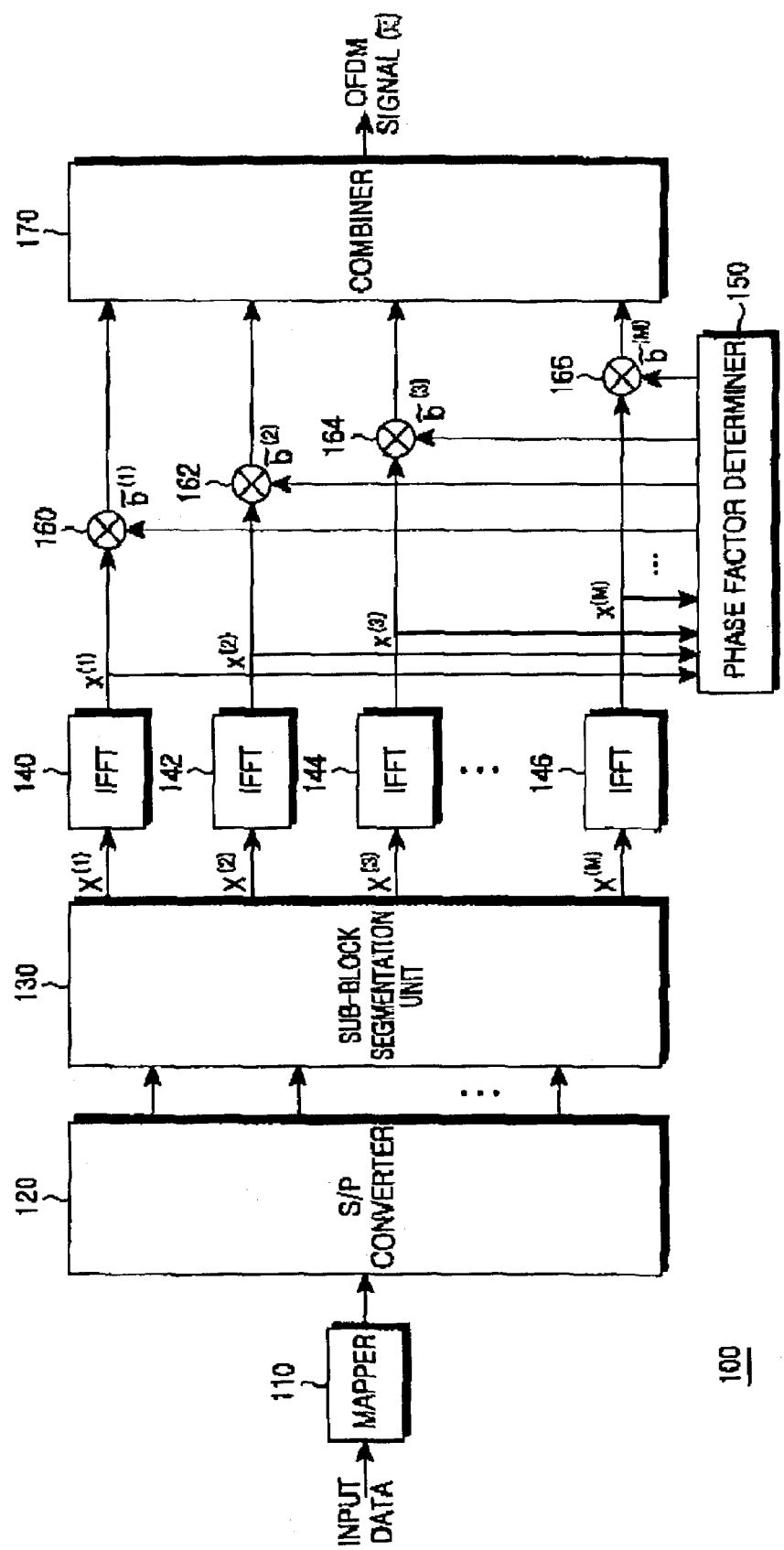
FIG. 1 illustrates an internal structure of a transmitter for a conventional PTS-OFDM communication system.
Figure 2:
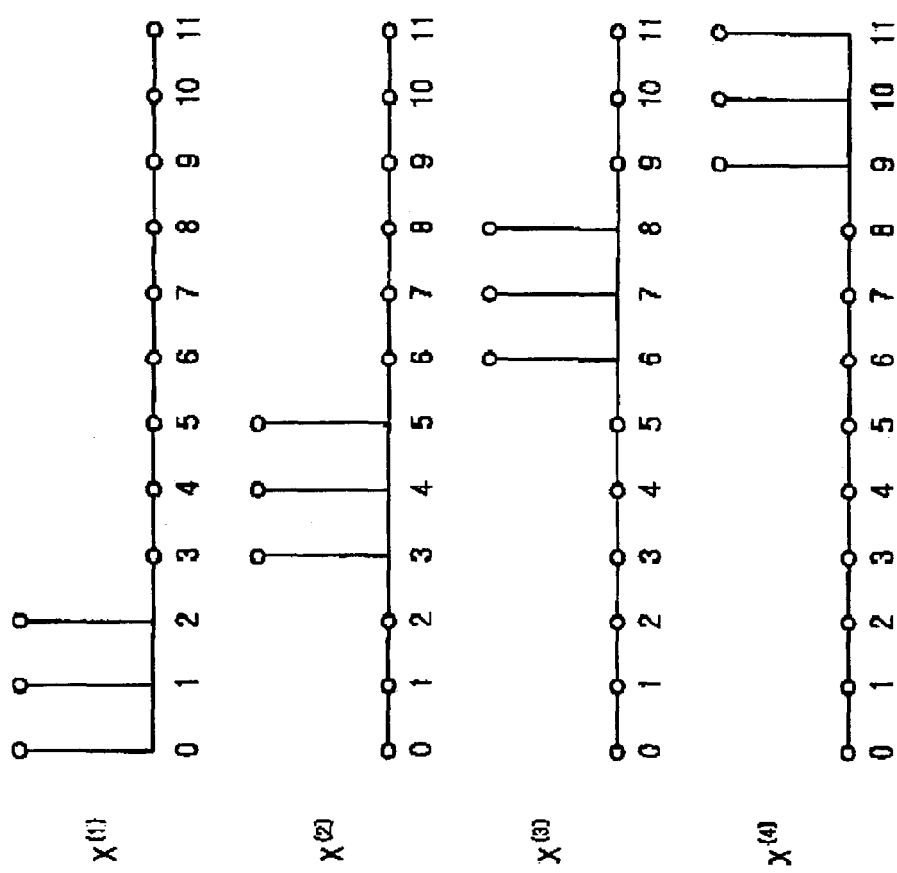
FIG. 2 illustrates data segmented according to an adjacent sub-block segmentation scheme, for L=12 and M=4.
Figure 3:
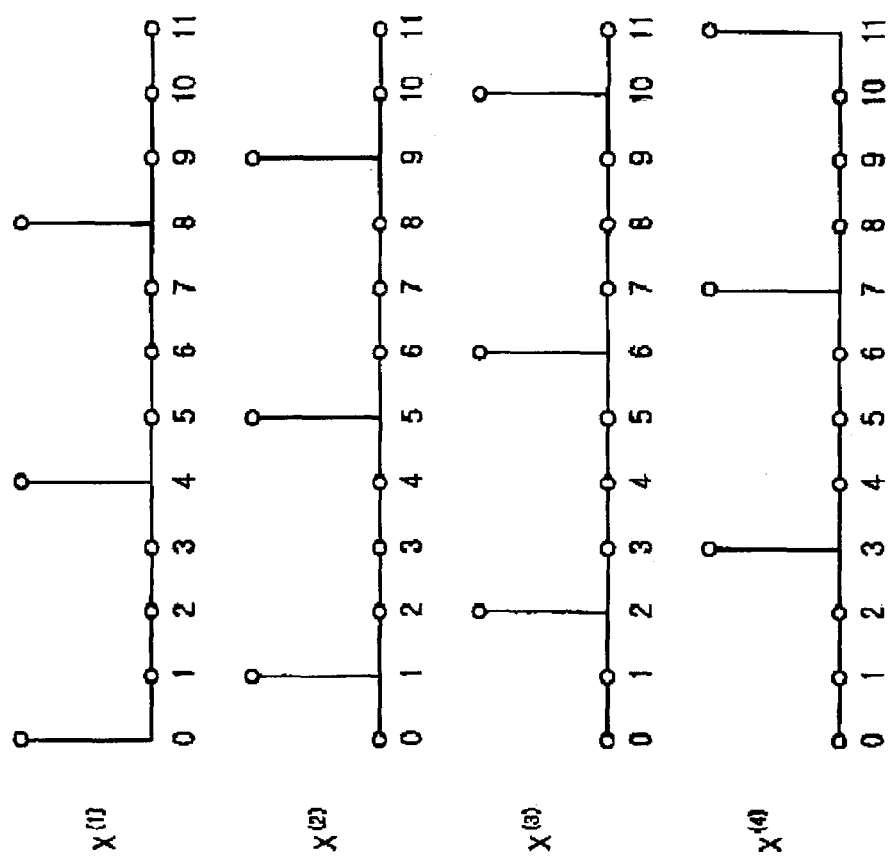
FIG. 3 illustrates data segmented according to an interleaved sub-block segmentation scheme, for L=12 and M=4.
Figure 4:
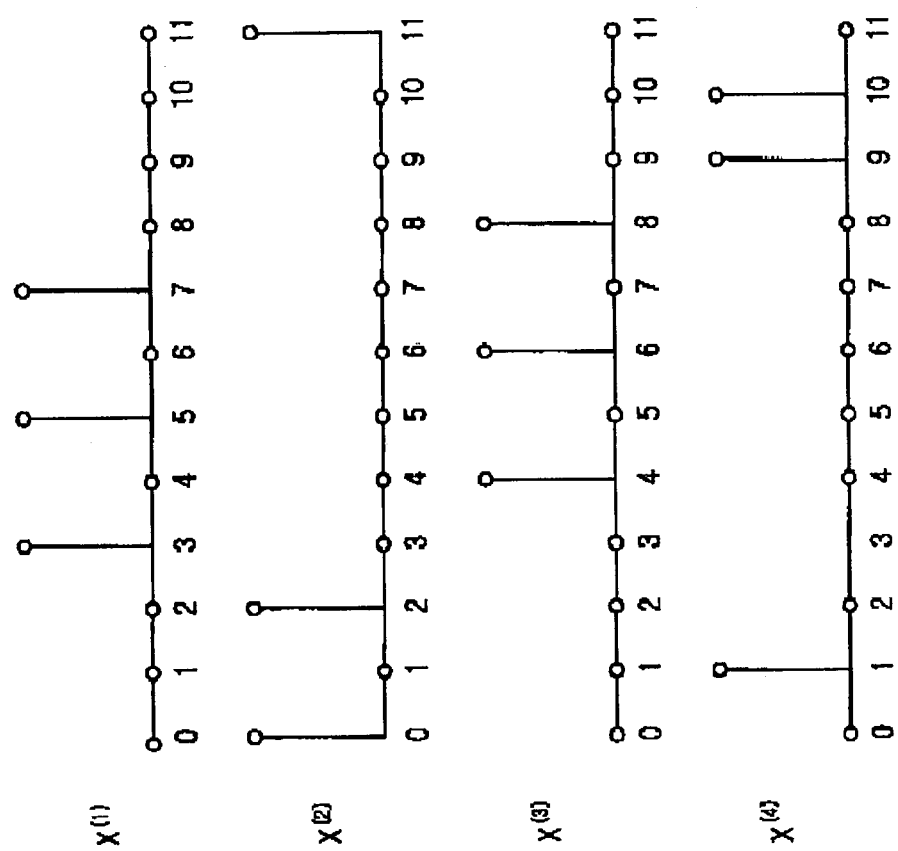
FIG. 4 illustrates data segmented according to a pseudo random sub-block segmentation scheme, for L=12 and M=4.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

The present invention provides an apparatus and method for reducing a peak-to-average power ratio (PAPR) while maintaining an original signal in a communication system employing an orthogonal frequency division multiplexing (OFDM) technology (hereinafter referred to as "OFDM communication system"). Specifically, the present invention provides an apparatus and method for transmitting and receiving side information for rotation factors, i.e., phase factors, for accurate data restoration in a receiver for an OFDM communication system employing a partial transmit sequence (hereinafter referred to as "PTS") scheme. The side information for the rotation factors is carried on a phase of a reference symbol that is transmitted along with data.

In the following description of the present invention, specific details such as OFDM modulation, inverse fast Fourier transform (hereinafter referred to as "IFFT"), fast Fourier transform (hereinafter referred to as "FFT"), spectrum efficiency, and bit error rate (BER) will be used for better understanding of the present invention. However, it would be obvious to those skilled in the art that the invention can be easily implemented without the specific details.

Figure 5:
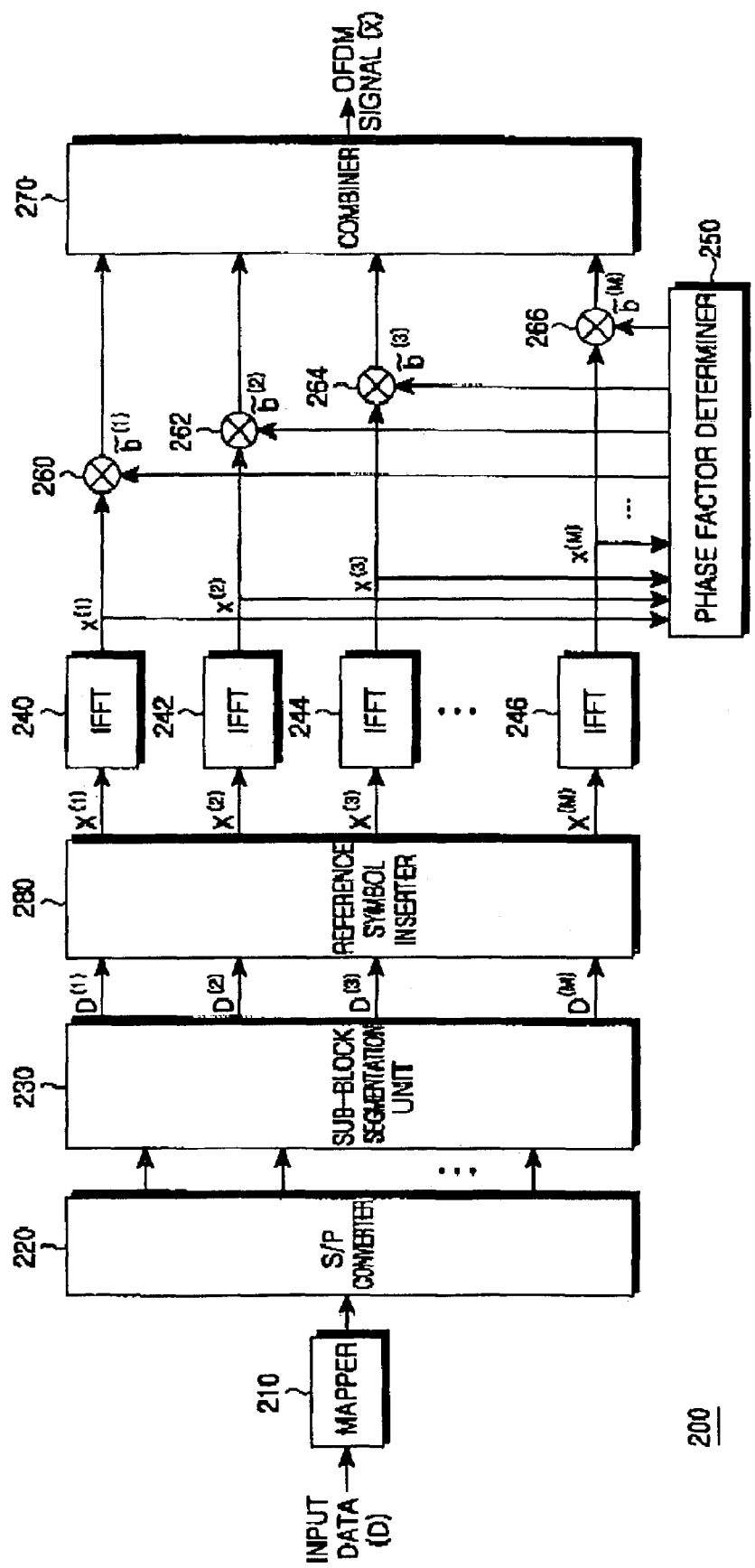
FIG. 5 illustrates an internal structure of a transmitter for a PTS-OFDM communication system according to an embodiment of the present invention.

FIG. 5 illustrates an internal structure of a transmitter for an OFDM communication system employing a PTS scheme (hereinafter referred to as "PTS-OFDM communication") according to an embodiment of the present invention. As illustrated in FIG. 5, a PTS-OFDM communication transmitter 200 includes a mapper 210, a serial-to-parallel (S/P) converter 220, a sub-block segmentation unit 230, a plurality of IFFT units 240, 242, 244 and 246, a phase factor determiner 250, a plurality of multipliers 260, 262, 264 and 266, a combiner 270, and a reference symbol inserter 280.

In the transmitter 200, transmission information is coded at a predetermined coding rate, and the coded bits generated by the coding are interleaved and then provided to the mapper 210 as input data D. Although various coding schemes have been proposed, a turbo coding scheme using a turbo code, which is an error correction code, is typically used as the coding scheme. The predetermined coding rate includes 1/2 and 3/4.

The mapper 210 maps the input data D to a corresponding modulation symbol according to a predetermined modulation scheme, and the S/P converter 220 converts the modulation symbols sequentially output from the mapper 210 into parallel symbols. The number of output symbols from the S/P converter 220 is smaller than the number 'L' of taps of the IFFT units 240 to 246. This is because reference symbols must be added to the output symbols of the S/P converter 220. Because one reference symbol is inserted into each sub-block, the number of parallel lines connected to the outputs of the S/P converter 220 must be smaller than the number 'L' of the input taps by the number 'M' of the sub-blocks. That is, the number of parallel lines must be 'L-M'.

The sub-block segmentation unit 230 segments modulation symbols output in parallel from the S/P converter 220 into M sub-blocks $D^{(1)}$ to $D^{(M)}$ having the same length N. As described in conjunction with the prior art, in each of sub-blocks segmented by the sub-block segmentation unit 230, all other symbols than the N symbols located in the determined positions are all replaced with 0. It is assumed herein that the S/P converter 220 and the sub-block segmentation unit 230 are separately provided. Of course, however, the S/P converter 220 can be removed, and instead, the sub-block segmentation unit 230 can include a function of the S/P converter 220. In this case, the sub-block segmentation unit 230 segments L symbols sequentially provided from the mapper 210 into M sub-blocks having a length N.

The reference symbol inserter 280 inserts a reference symbol having an amplitude 1 and a phase 0° in a preset position of each of the sub-blocks $D^{(1)}$ to $D^{(M)}$, thereby generating new sub-blocks $X^{(1)}$ to $X^{(M)}$. The new sub-blocks $X^{(1)}$ to $X^{(M)}$ each have one more symbol, compared with the sub-blocks $D^{(1)}$ to $D^{(M)}$. Herein, phases of the reference symbols inserted in the sub-blocks $D^{(1)}$ to $D^{(M)}$ are all set to 0° so that a receiver can detect phase factors of the sub-blocks from the phases of received reference symbols.

In an alternative embodiment, phases of the reference symbols can be alternately set to 0° and 180°, or sequentially set to 0°, 90°, 180° and 270°. In another preferred embodiment, phases of the reference symbols can be set to complementary sequence phases of Walsh sequence phases.

Figure 6:
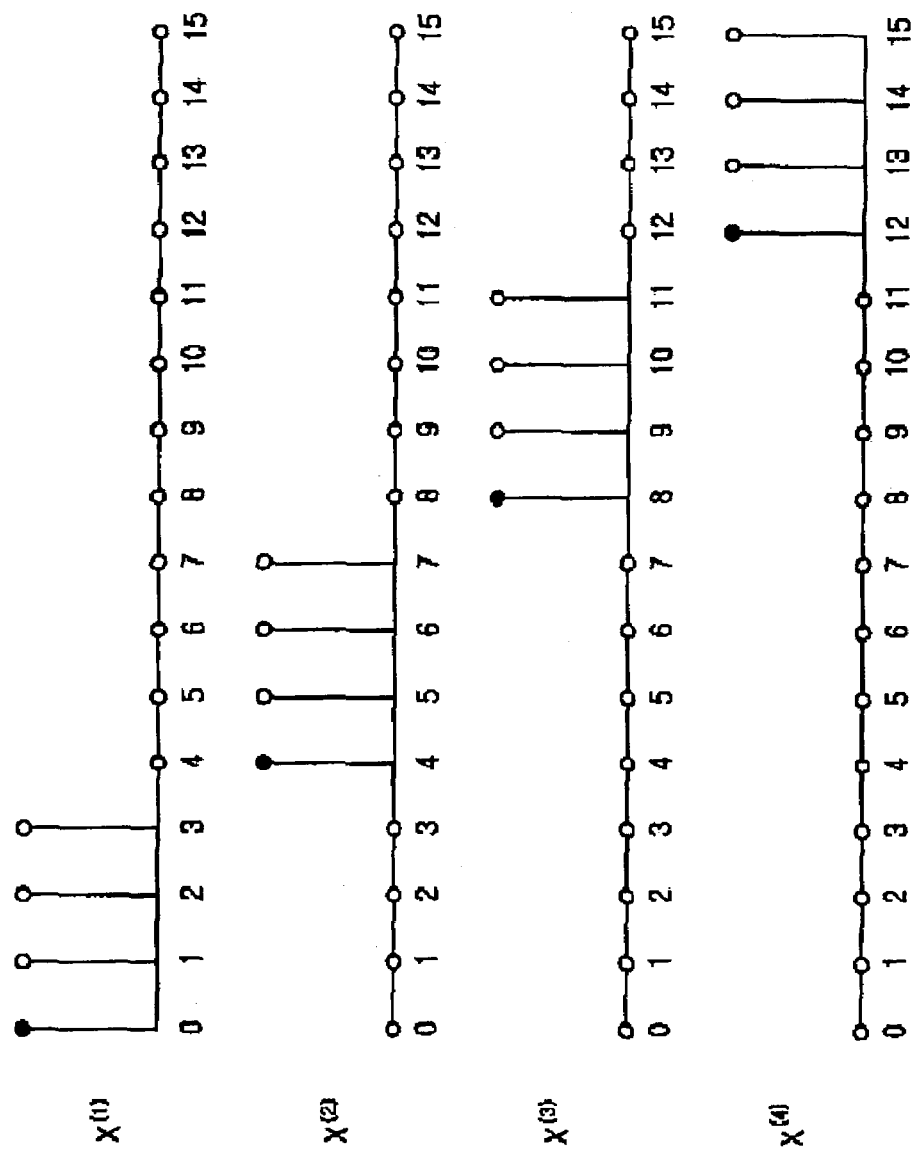
FIG. 6 illustrates data and reference symbols segmented according to an adjacent sub-block segmentation scheme, for L=16 and M=4.
Figure 7:
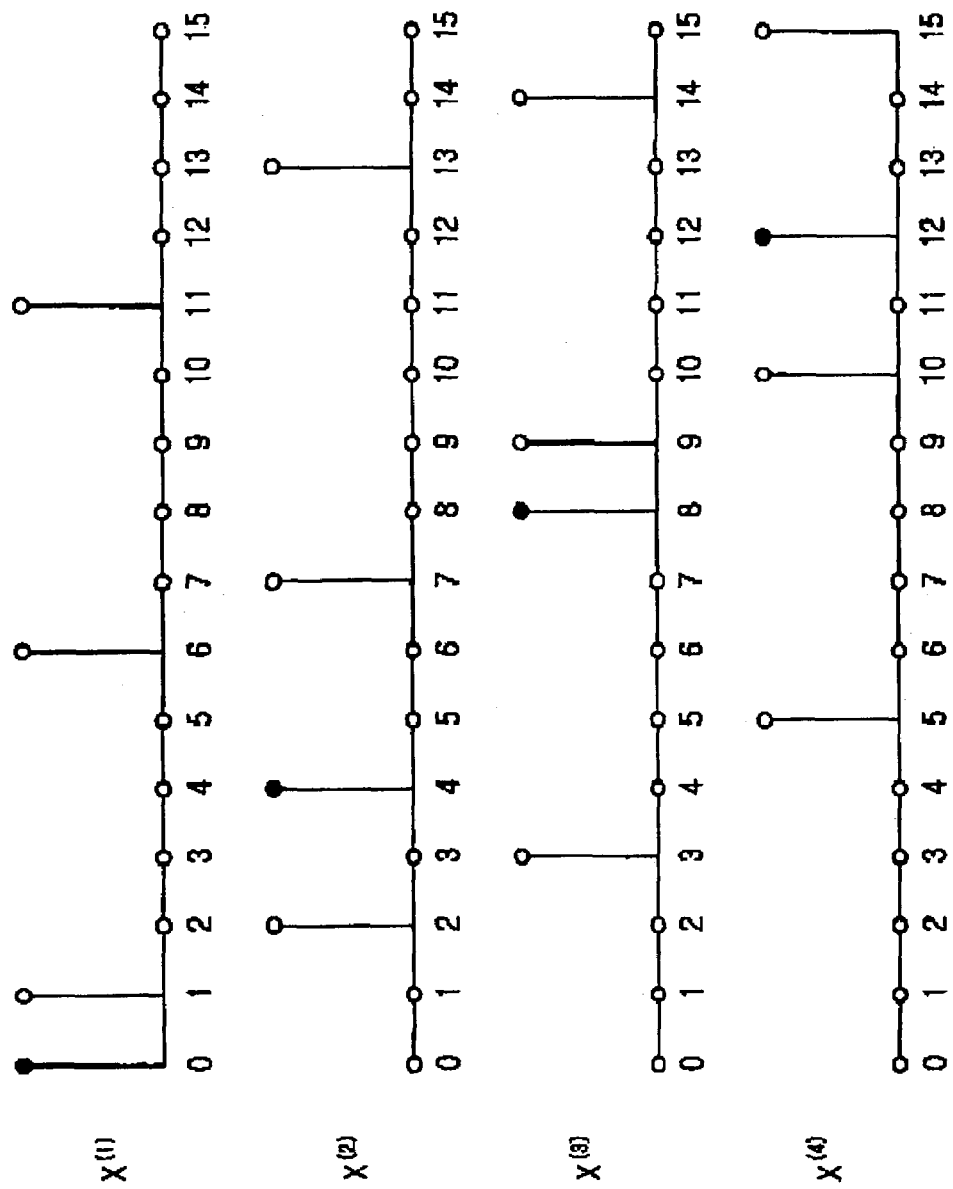
FIG. 7 illustrates data and reference symbols segmented according to an interleaved sub-block segmentation scheme, for L=16 and M=4.
Figure 8:
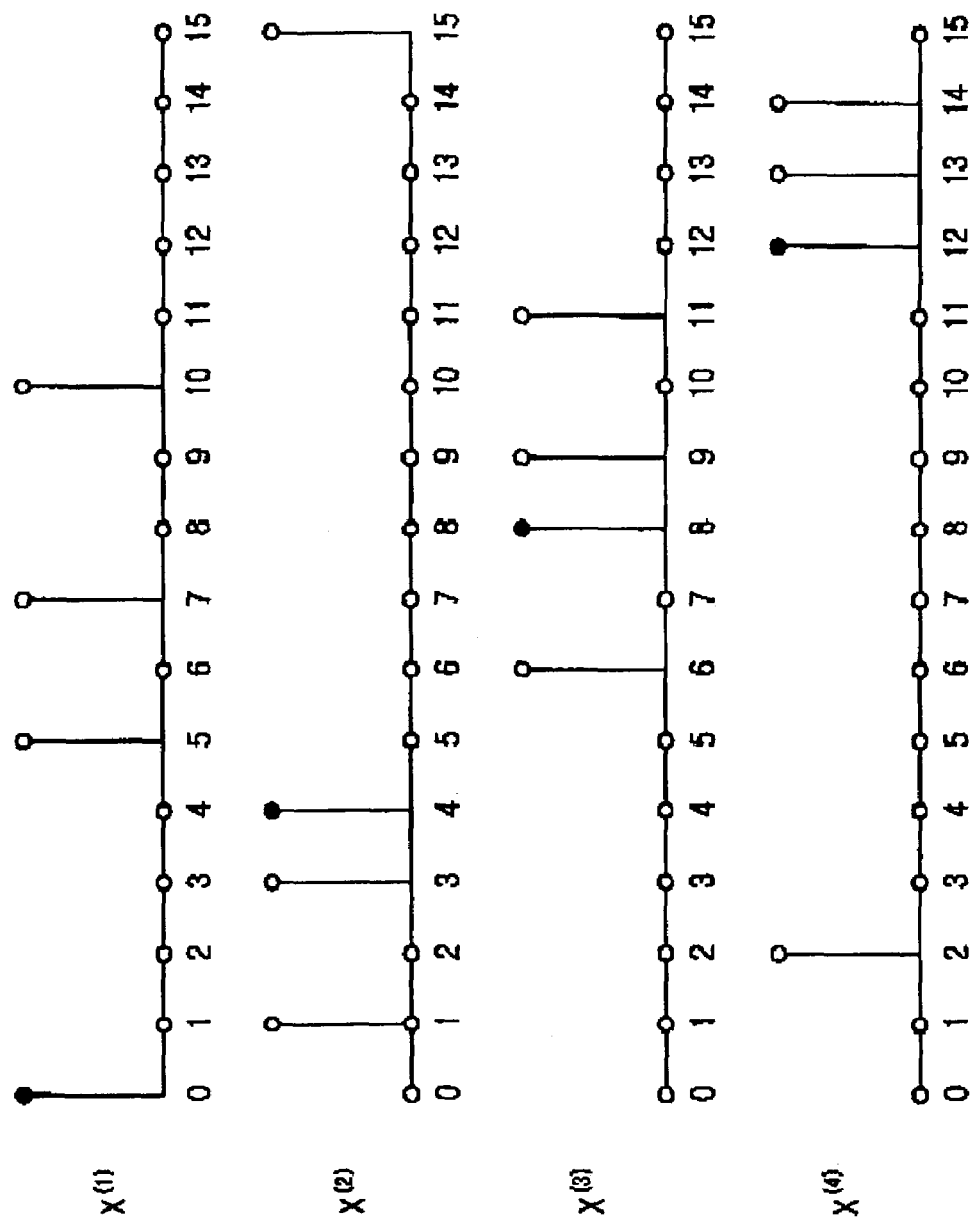
FIG. 8 illustrates data and reference symbols segmented according to a pseudo random sub-block segmentation scheme, for L=6 and M=4.

Methods of inserting reference symbols according to a type of sub-block segmentation schemes of the sub-block segmentation unit 230 are illustrated in FIGS. 6 to 8. In FIGS. 6 to 8, white circle represent data symbols, while black circles represent reference symbols.

It is assumed in FIGS. 6 to 8 that there are provided IFFT units having 16 taps, and 4 sub-blocks having a length 3 (L=16, N=3, and M=4). FIG. 6 illustrates sub-blocks segmented according to an adjacent sub-block segmentation scheme, FIG. 7 illustrates sub-blocks segmented according to an interleaved sub-block segmentation scheme, and FIG. 8 illustrates sub-blocks segmented according to a pseudo random sub-block segmentation scheme. In all of the sub-block segmentation schemes, sub-blocks are segmented in such a way that each sub-block should not overlap with other sub-blocks, and reference symbols are inserted in the same positions regardless of the sub-block segmentation schemes. This is because a receiver previously recognizes the positions where the reference symbols are inserted, and determines phase factors of the sub-blocks according to the extent by which phases of the reference symbols are rotated.

A description will now be made of the sub-block segmentation schemes.

(1) Adjacent Sub-Block Segmentation Scheme

The adjacent sub-block segmentation scheme segments modulation symbols of length L into sub-blocks by the sequentially adjacent modulation symbols. As illustrated in FIG. 6, if the length L is 16, the adjacent sub-block segmentation scheme segments the modulation symbols of length 16 into 4 sub-blocks by the 4 sequentially adjacent modulation symbols, i.e., 3 modulation symbols and 1 reference symbol.

(2) Interleaved Sub-Block Segmentation Scheme

The interleaved sub-block segmentation scheme segments modulation symbols of length L into sub-blocks by interleaving. As illustrated in FIG. 7, if the length L is 16, the interleaved sub-block segmentation scheme segments the modulation symbols of length 16 into a total of 4 sub-blocks by combining 3 modulation symbols at periods of 5 modulation symbols, and 1 reference symbol.

(3) Pseudo Random Sub-Block Segmentation Scheme

The pseudo random sub-block segmentation scheme segments modulation symbols of length L into sub-blocks by pseudo-randomly selecting the modulation symbols. As illustrated in FIG. 8, if the length L is 16, the pseudo random sub-block segmentation scheme segments the modulation symbols of length 16 into a total of 4 sub-blocks by randomly combining 3 modulation symbols and 1 reference symbol located in the preset position, without any rule or pattern.

The IFFT units 240 to 246 perform IFFT on each of the reference symbol-inserted sub-blocks, and generate IFFT-transformed sub-blocks $x^{(1)}$ to $x^{(M)}$. The phase factor determiner 250 receives the IFFT-transformed sub-blocks $x^{(1)}$ to $x^{(M)}$ and determines phase factors $\tilde{b}^{(1)}$ to $\tilde{b}^{(M)}$ of the corresponding sub-blocks in such a way that phases of the sub-blocks should be different from one another, in order to minimize PAPR when the sub-blocks $x^{(1)}$ to $x^{(M)}$ are summed. Herein, $\{\pm 1\}$ or $\{\pm 1, \pm j\}$ is used as the phase factors.

The multipliers 260 to 266 multiply the IFFT-transformed sub-blocks $x^{(1)}$ to $x^{(M)}$ by the corresponding phase factors $\tilde{b}^{(1)}$ to $\tilde{b}^{(M)}$, and provide their outputs to the combiner 270. The combiner 270 generates an OFDM signal $\tilde{x}$ by combining (or summing) the outputs of the multipliers 260 to 266.

A PTS operation according to the present invention will now be described in more detail with reference to the following formulas.

Equation (1) represents input data D segmented into M sub-blocks $D^{(1)}$ to $D^{(M)}$, and reference symbols R ($R^{(1)}$ to $R^{(M)}$) inserted in the corresponding sub-blocks.

$$D = \sum_{m=1}^{M} D^{(m)}, \quad D = MPSK \text{ or } MQAM \qquad \text{Equation (1)}$$

$$R = \sum_{m=1}^{M} R^{(m)}, \quad R = e^{j0} = 1$$

In Equation (1), D denotes data, and R denotes a reference symbol. The data D is segmented into a plurality of sub-blocks $D^{(1)}$ to $D^{(M)}$ having the same size according to a selected one of the adjacent sub-block segmentation scheme, the interleaved sub-block segmentation scheme, and the pseudo random sub-block segmentation scheme, described in conjunction with FIGS. 6 to 8.

The sub-blocks comprised of the data D and the reference symbols R can be represented by $$X = D + R = \sum_{m=1}^{M} (D^{(m)} + R^{(m)}) = \sum_{m=1}^{M} X^{(m)} \qquad \text{Equation (2)}$$

In Equation (2), X denotes a sub-block.

The phase factor determiner 250 determines proper phase factors that will be multiplied by the M segmented sub-blocks in order to minimize PAPR. If the phase factors to be multiplied by the sub-blocks are defined as 'b', an input $\hat{X}$ of the IFFT unit 240 is represented by $$\hat{X} = \sum_{m=1}^{M} b^{(m)} X^{(m)} \qquad \text{Equation (3)}$$

In Equation (3), $\{b^{(m)}, m=1, 2, \ldots, M\}$ represents phase factors multiplied by the sub-blocks, and it is assumed that the phase factors simply control a rotation operation over the IFFT-transformed sub-blocks. The input $\hat{X}$ represented by Equation (3) is converted into a time domain by the IFFT unit 240, and the result $\hat{x}$ is represented by $$\hat{x} = \sum_{m=1}^{M} b^{(m)} x^{(m)} \qquad \text{Equation (4)}$$

In Equation (4), the vector $x^{(m)}$ indicates PTS.

Phase factors $b^{(m)}$ determined to minimize PAPR of the $\hat{x}$ are selected by $$\{\tilde{b}^{(1)}, \tilde{b}^{(2)}, \ldots \tilde{b}^{(M)}\} = \qquad \text{Equation (5)}$$

$$\left\{b^{(1)}, b^{(2)}, \ldots b^{(M)}\right\}^{argmin} \left(0 \le l \le L-1 \left| \sum_{m=1}^{M} b^{(m)} x_l^{(m)} \right| \right)$$

In Equation (5), L denotes the number of input taps, or the number of sub-carriers, and l denotes an index for identifying each of the sub-carriers. Equation (5) selects a set of phase factors for minimizing a maximum value determined by multiplying the sub-blocks by the phase factors. A set of the phase factors will be referred to as "rotation factor." An optimized transmission signal for the rotation factor is defined as $$\tilde{x} = \sum_{m=1}^{M} \tilde{b}^{(m)} x^{(m)} \qquad \text{Equation (6)}$$

Figure 9:
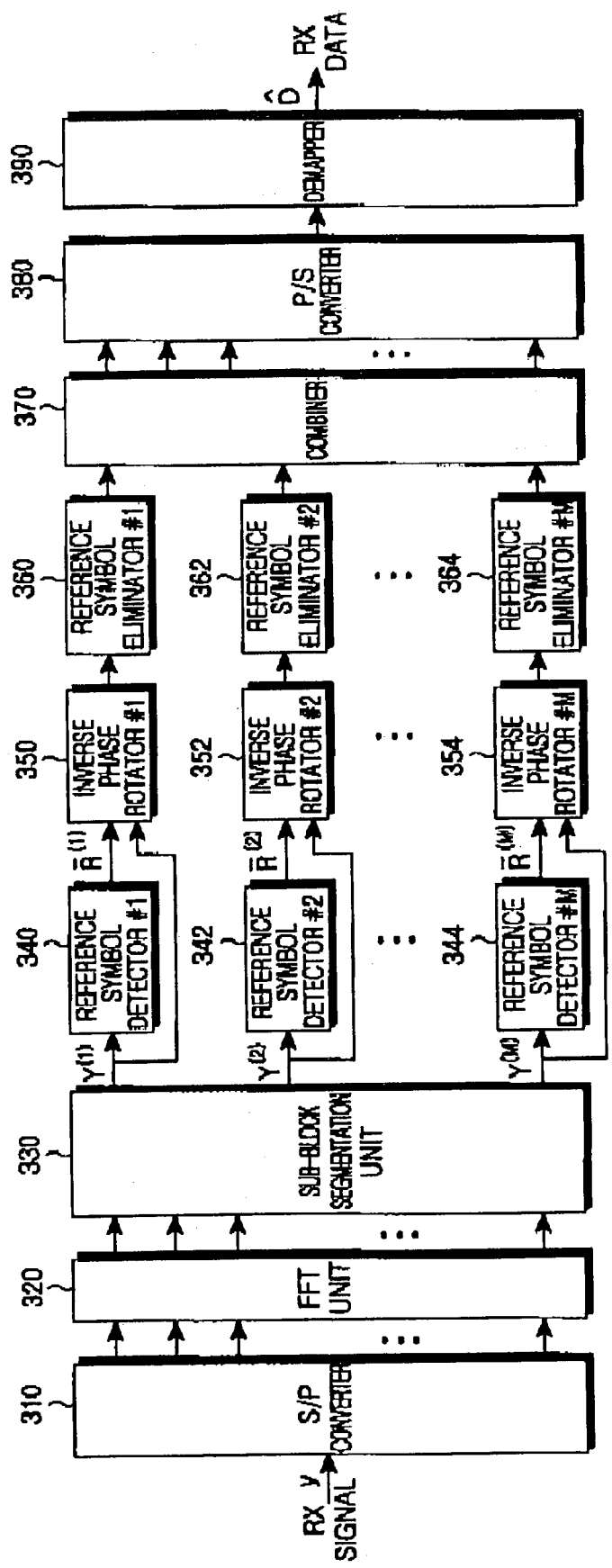
FIG. 9 illustrates an internal structure of a receiver for a PTS-OFDM communication system according to an embodiment of the present invention.

FIG. 9 illustrates an internal structure of a receiver for a PTS-OFDM communication system according to an embodiment of the present invention. As illustrated in FIG. 9, a PTS-OFDM communication receiver 300 includes a serial-to-parallel (S/P) converter 310, an FFT unit 320, a sub-block segmentation unit 330, a plurality of reference symbol detectors 340, 342, and 344, a plurality of inverse phase rotation units 350, 352, and 354, a plurality of reference symbol eliminators 360, 362, and 364, a combiner 370, a parallel-to-serial (P/S) converter 380, and a demapper 390.

Received radio frequency (RF) signals carried on a plurality of sub-carriers are converted into digital signals, and the digital signals undergo a predetermined signal processing process for synchronization and node cancellation, and then are provided to the S/P converter 310 as a received signal y.

The S/P converter 310 converts the received signal y into parallel symbols by the symbol, and provides the parallel symbols to L parallel lines, where L represents the number of input taps of the FFT unit 320. The FFT unit 320 performs L-point FFT on the parallel symbols output from the S/P converter 310. The sub-block segmentation unit 330 segments the L symbols output from the FFT unit 320 into M sub-blocks having the same length, and provides the segmented sub-blocks to the reference symbol detectors 340 to 344.

The reference symbol detectors 340 to 344 each detect reference symbols from the sub-blocks provided from the sub-block segmentation unit 330. Since the reference symbol inserted by a transmitter has amplitude 1 and a phase 0°, a phase of the detected reference symbol represents phase variation, i.e., a phase factor, of symbols constituting a corresponding sub-block. As described above, because the transmitter 200 and the receiver 300 both know the position where the reference symbol is inserted, the reference symbol detectors 340 to 344 can detect a reference symbol from each of the sub-blocks.

The inverse phase rotation units 350 to 354 inversely rotate phases of the sub-blocks received from the sub-block segmentation unit 330 by the phase variation of the reference symbols detected by the reference symbol detectors 340 to 344. The reference symbol eliminators 360 to 364 eliminate reference symbols from the sub-blocks provided from the inverse phase rotation units 350 to 354. The combiner 370 combines outputs of the reference symbol eliminators 360 to 364 by the symbol. Parallel outputs of the combiner 370 are converted into a serial signal by the P/S converter 380, and then restored into received data $\hat{D}$ by the demapper 390 according to a corresponding modulation scheme.

With reference to the structure of the transmitter 200, a detailed description will now be made of a procedure for extracting side information and restoring data by the transmitter 300 of the PTS-OFDM communication system.

A signal y received over a radio channel is represented by $$y = \tilde{x} + n \qquad \text{Equation (7)}$$

In Equation (7), $\tilde{x}$ denotes a transmission signal, and n represents a noise. If the received signal y is FFT-transformed, the resultant signal Y is represented by $$\begin{aligned}
Y &= FFT\{\tilde{x} + n\} \qquad \text{Equation (8)} \\
&= FFT\left\{\sum_{m=1}^{M} \hat{b}^{(m)} x^{(m)}\right\} + FFT\{n\} \\
&= \sum_{m=1}^{M} \hat{b}^{(m)} FFT\{x^{(m)}\} + N \\
&= \sum_{m=1}^{M} \hat{b}^{(m)} X^{(m)} + N \\
&= \sum_{m=1}^{M} \hat{b}^{(m)} (D^{(m)} + R^{(m)}) + N \\
&= \sum_{m=1}^{M} \hat{b}^{(m)} D^{(m)} + \sum_{m=1}^{M} \hat{b}^{(m)} R^{(m)} + N \\
&= \sum_{m=1}^{M} \overline{D}^{(m)} + \sum_{m=1}^{M} \overline{R}^{(m)} + N \\
&= \overline{D} + \overline{R} + N
\end{aligned}$$

In Equation (8), $x^{(m)}$ denotes an $m^{th}$ sub-block constituting the transmission signal $\tilde{x}$, $\hat{b}^{(m)}$ denotes an $m^{th}$ phase factor applied to the $m^{th}$ sub-block, and N denotes an FFT-transformed noise. If the FFT-transformed $x^{(m)}$ is expressed with $X^{(m)}$ as illustrated above, the $X^{(m)}$ can be divided into a reference symbol $R^{(m)}$ and actual data $D^{(m)}$. Therefore, the received signal is divided into data $\overline{D}$, reference symbol $\overline{R}$, and noise N. Because a reference symbol inserted by the transmitter is characterized by $R^{(m)} = e^{j0} = 1$, the reference symbol $\overline{R}$ can be represented by $$\overline{R} = \sum_{m=1}^{M} \overline{R}^{(m)} = \sum_{m=1}^{M} \hat{b}^{(m)} R^{(m)} = \sum_{m=1}^{M} \hat{b}^{(m)} \qquad \text{Equation (9)}$$

Therefore, a phase of a reference symbol $$\overline{R} = \sum_{m=1}^{M} \hat{b}^{(m)} = \{\hat{b}^{(1)}, \hat{b}^{(2)}, \ldots \hat{b}^{(M)}\}$$

inserted in the received signal represents a phase factor, i.e., side information.

Equation (10) below multiplies the received signal by an inverse value $(\overline{R})^*$ of a phase of the received reference symbol in order to restore data. Here, * represents inverse rotation of a phase.

$$\begin{aligned}
\hat{Y} &= (\overline{D} + \overline{R} + N) \cdot (\overline{R})^* = \left(\sum_{m=1}^{M} \overline{D}^{(m)} + \sum_{m=1}^{M} \overline{R}^{(m)} + N\right) \cdot (\overline{R}^{(m)})^* \quad \text{Equation(10)} \\
&= \sum_{m=1}^{M} \hat{b}^{(m)} D^{(m)} (R^{(m)})^* + \sum_{m=1}^{M} \hat{b}^{(m)} R^{(m)} (\overline{R}^{(m)})^* + N(\overline{R}^{(m)})^* \\
&= \sum_{m=1}^{M} \hat{b}^{(m)} D^{(m)} (\hat{b}^{(m)})^* + \sum_{m=1}^{M} \hat{b}^{(m)} R^{(m)} (\hat{b}^{(m)})^* + N(\hat{b}^{(m)})^* \\
&= \sum_{m=1}^{M} D^{(m)} + \sum_{m=1}^{M} R^{(m)} + N(\hat{b}^{(m)})^*
\end{aligned}$$

If a reference symbol in a second term is excluded from the result of Equation (10), the received signal is represented by $$\hat{Y} = \sum_{m=1}^{M} D^{(m)} + N(\hat{b}^{(m)})^* = D + N' = \hat{D} \qquad \text{Equation (11)}$$

Here, if the noise is ignored, data is exactly restored.

Now, a description will be made as to how the accurate transmission/reception of side information for a PTS scheme affects the OFDM communication system when the OFDM communication system employs the PTS scheme in order to reduce PAPR.

If a side information error occurs, the total bit error rate of the system is represented by Equation (12)

$$P = P_b \cdot (1 - P_S) + P_{b|False} \cdot P_S \qquad \text{Equation (12)}$$

In Equation (12), $P_b$ denotes a bit error rate in an AWGN (Additive White Gaussian Noise) channel during QPSK modulation, and is defined as $$P_b = Q\left(\sqrt{\frac{\sigma_S^2}{\sigma_N^2}}\right) = Q\left(\sqrt{\frac{2E_b}{N_o}}\right) \qquad \text{Equation (13)}$$

In addition, $P_{b|False}$ denotes a conditional bit error rate in a condition where side information has an error, and is defined as $$P_{b|False} = Q\left(\sqrt{\frac{\sigma_S^2}{\sigma_N^2 + \sigma_{False}^2}}\right) = Q\left(\sqrt{\frac{2E_b}{N_o + (N-M) \cdot 2E_b}}\right) \qquad \text{Equation (14)}$$

In Equation (14), Q( ) denotes a known Q function, and $\sigma_S^2$ denotes distribution of a received signal and is expressed as $\sigma_S^2 = 2E_b$ by bit energy $E_b$ of the received signal. In addition, $\sigma_N^2$ denotes distribution of a noise when a side information error occurs, and is expressed as $\sigma_{False}^2 = (N-M) \cdot 2E_b$.

Figure 10:
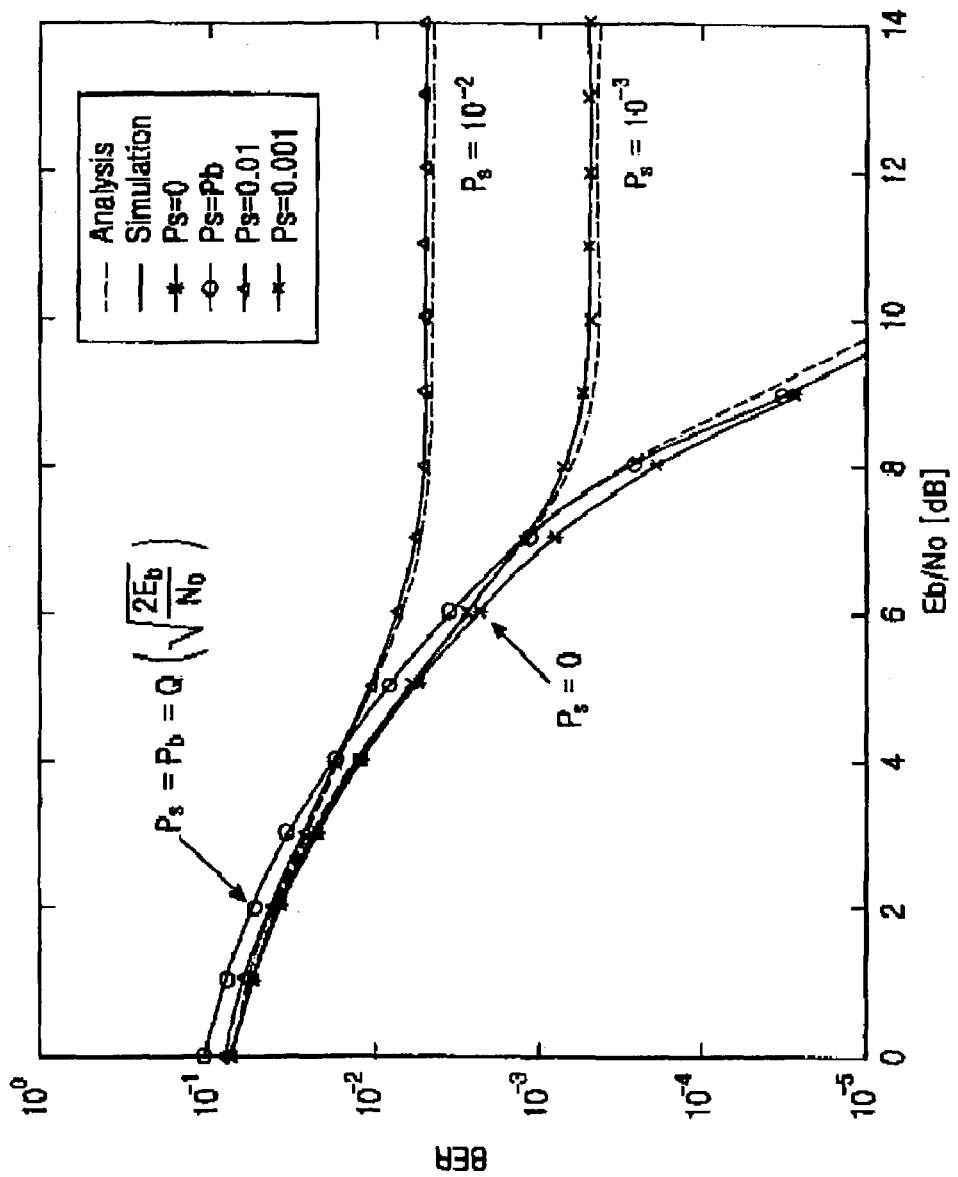
FIG. 10 illustrates a comparison on PAPR reduction performance between a novel PTS-OFDM communication system and an existing PTS-OFDM communication system.

FIG. 10 illustrates a comparison on a complementary cumulative distribution function (CCDF) of PAPR among a conventional OFDM communication system not employing the PTS scheme, a conventional PTS-OFDM communication system, and a novel PTS-OFDM communication system that transmits side information (SI). The CCDF is a probability that PAPR will be higher than a predetermined threshold value $PAPR_0$. As illustrated, the novel PTS-OFDM communication system shows the same PAPR reduction performance as the conventional PTS-OFDM communication system.

Figure 11:
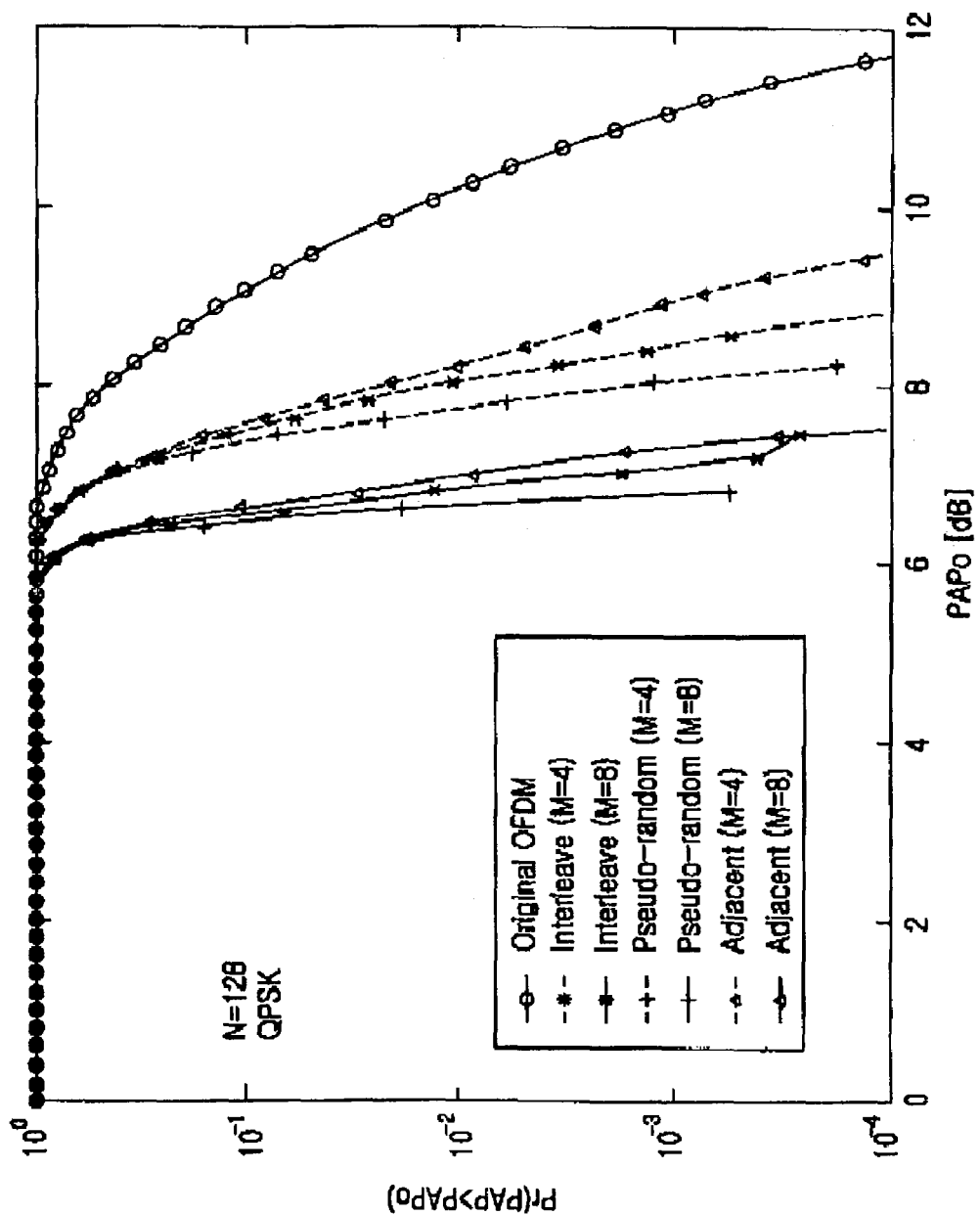
FIG. 11 illustrates a comparison on PAPR reduction performance among sub-block segmentation schemes in a PTS-OFDM communication system according to an embodiment of the present invention.

FIG. 11 illustrates a comparison on CCDF of PAPR among OFDM communication systems employing the adjacent sub-block segmentation scheme, the interleaved sub-block segmentation scheme, and the pseudo random sub-block segmentation scheme. As illustrated in FIG. 11, the pseudo random sub-block segmentation scheme is most superior and the adjacent sub-block segmentation scheme is most inferior in terms of PAPR reduction performance. In the present invention, the interleaved sub-block segmentation scheme segments only data by interleaved sub-block segmentation, and inserts a reference symbol therein. That is, only data is segmented by interleaved sub-block segmentation. PAPR reduction performance by the interleaved sub-block segmentation scheme is superior to that of the adjacent sub-block segmentation scheme.

Figure 12:
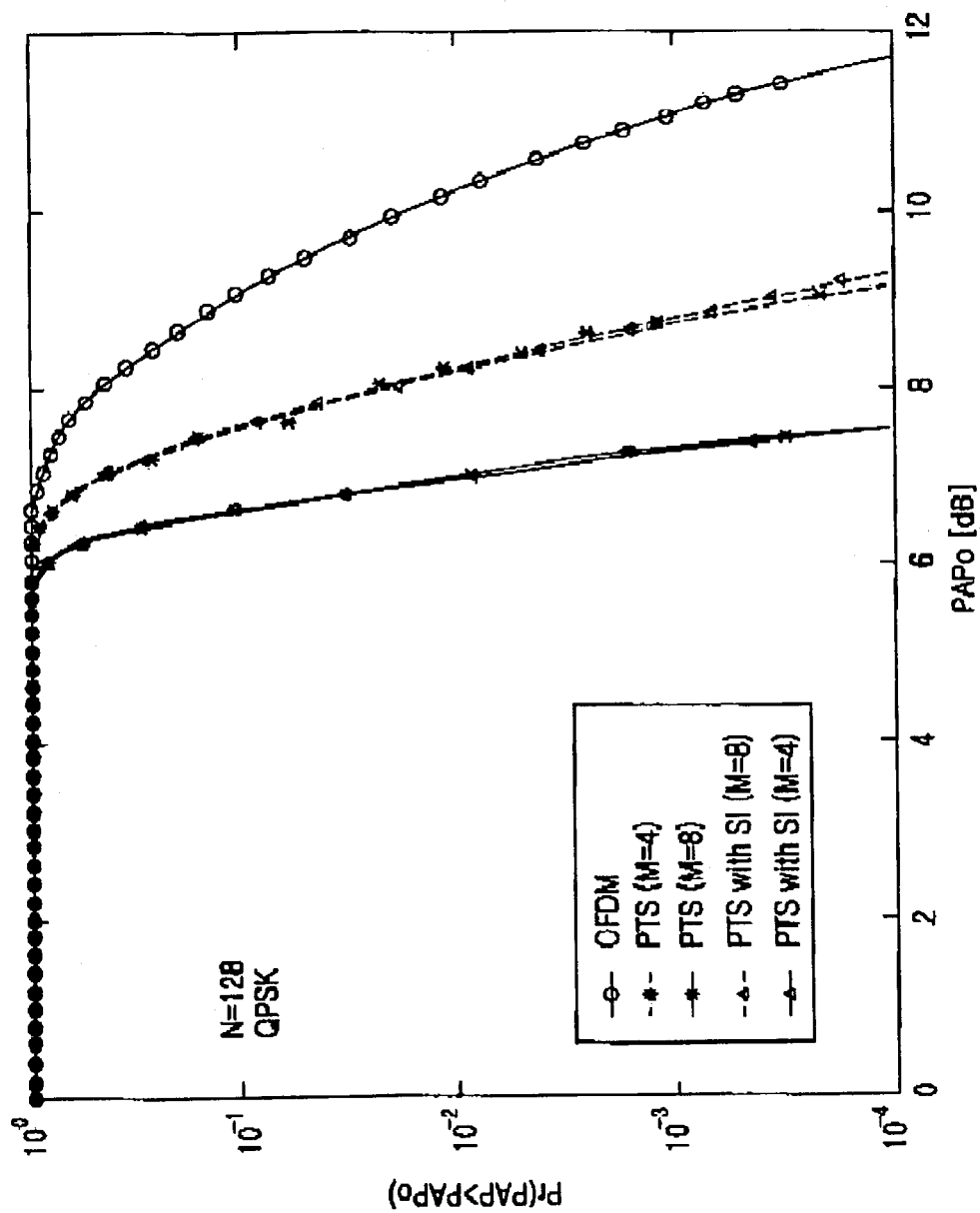
FIG. 12 comparatively illustrates an error bit rate of a PTS-OFDM communication system according to side information.

FIG. 12 illustrates numerical analysis results and simulation results on Equation (12). In FIG. 12, when $P_S=10^{-2}$ and $10^{-3}$, an error floor occurs. However, when $P_S=P_b$, performance deterioration due to a side information error is not so high. In addition, a bit error rate for $P_S=0$ is equal to an error rate of QPSK modulation in AWGN.

As described above, the present invention is applied to a PTS scheme for efficiently reducing a high PAPR, which is the biggest drawback when using multiple sub-carriers in an OFDM communication system, and the present invention transmits side information related to the use of the PTS scheme so that a receiver can accurately restore information data. A side information transmission/reception apparatus and method proposed by the present invention can be applied regardless of a type of a modulation scheme, and can be realized with a simple structure. Furthermore, the proposed apparatus and method can maintain PAPR reduction performance. In addition, the novel side information transmission method using a reference symbol can transmit the side information on a real-time basis, so it can be applied to an OFDM communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmission apparatus for an orthogonal frequency division multiplexing (OFDM) communication system that multiplexes data with a plurality of orthogonal sub-carriers, the apparatus comprising:
   a sub-block segmentation unit for segmenting parallel data generated by parallel-converting a serial data stream, into a plurality of sub-blocks having at least one data block;
   a reference symbol inserter for inserting a reference symbol having information comprising a predetermined phase value and size, into each of the segmented sub-blocks;
   a plurality of Inverse Fast Fourier Transform (IFFT) units for independently IFFT-transforming the sub-blocks into time-base signals where sub-carrier frequencies are separately assigned to the data blocks;
   a plurality of multipliers for separately multiplying the IFFT-transformed signals by predetermined associated phase factors; and
   a combiner for combining outputs of the multipliers and transmitting the combined result.

2. The transmission apparatus of claim 1, wherein the phase value of the reference symbol is set to 0°.

3. The transmission apparatus of claim 1, wherein the phase value of the reference symbol is alternately set to 0° and 180° according to the sub-blocks.

4. The transmission apparatus of claim 1, wherein the phase value of the reference symbol is sequentially set to 0°, 90°, 180°, and 270° according to the sub-blocks.

5. The transmission apparatus of claim 1, wherein the reference symbol has a complementary sequence phase according to the sub-blocks.

6. The transmission apparatus of claim 1, wherein the reference symbol has a Walsh sequence phase according to the sub-blocks.

7. The transmission apparatus of claim 1, further comprising a phase factor determiner for determining phase factors of the IFFT-transformed time-based signals to reduce a peak-to-average power ratio (PAPR) where non-linear distortion occurs due to coincidence of phases of data blocks IFFT-transformed with the sub-carrier frequencies.

8. The transmission apparatus of claim 1, wherein the size of the reference symbol is 1.

9. The transmission apparatus of claim 1, wherein the reference symbol is inserted into a predetermined position.

10. A transmission method for an orthogonal frequency division multiplexing (OFDM) communication system that multiplexes data with at least one orthogonal sub-carrier frequency, the method comprising the steps of:
    converting a serial data stream into parallel data;
    segmenting the parallel data into a plurality of blocks having a plurality of data blocks;
    inserting reference data having information comprising a predetermined phase value and size, into each of the segmented blocks;
    Inverse Fast Fourier Transform (IFFT)-transforming the respective blocks into time-based signals where sub-carrier frequencies are separately assigned to the data blocks;
    determining phase factors of the IFFT-transformed time-based signals to reduce a Peak-to-Average Power Ratio (PAPR) where non-linear distortion occurs due to coincidence of phases of the data blocks IFFT-transformed with the sub-carrier frequencies; and
    phase-rotating the IFFT-transformed signals according to the determined phase factors before transmission.

11. The transmission method of claim 10, wherein the phase value is set to 0°.

12. The transmission method of claim 10, wherein the phase value is alternatively set to 0° or 180° according to the blocks.

13. The transmission method of claim 10, wherein the phase value is sequentially set to 0°, 90°, 180°, and 270° according to the blocks.

14. The transmission method of claim 10, wherein the phase value has a complementary sequence phase according to the blocks.

15. The transmission method of claim 10, wherein the size of the reference symbol is 1.

16. The transmission method of claim 10, wherein the reference symbol is inserted into a predetermined position.

17. The transmission method of claim 10, wherein the phase value has a Walsh sequence phase according to the blocks.

18. A transmission method for an orthogonal frequency division multiplexing (OFDM) communication system that multiplexes data with a plurality of orthogonal sub-carriers, comprising the steps of converting a serial data stream into parallel data, segmenting the parallel data into at least one blocks having a plurality of data blocks, Inverse Fast Fourier Transform (IFFT)-transforming the blocks into time-based signals where sub-carrier frequencies are separately assigned to the data blocks, determining phase factors of the IFFT-transformed time-based signals to reduce a Peak-to-Average Power Ratio (PAPR) where non-linear distortion occurs due to coincidence of phases of the data blocks IFFT-transformed with the sub-carrier frequencies, and phase-rotating the IFFT-transformed signals according to the determined phase factors before transmission;

wherein reference data having information comprising a predetermined phase value and size into which the reference data is inserted is inserted into each sub-block between the segmentation step and the IFFT transforming step.

19. The transmission method of claim 18, wherein the phase value is set to 0°.

20. The transmission method of claim 18, wherein the phase value is alternately set to 0° and 180° according to the blocks.

21. The transmission method of claim 18, wherein the phase value is sequentially set to 0°, 90°, 180°, and 270° according to the blocks.

22. The transmission method of claim 18, wherein the phase value is set to have a complementary sequence phase according to the blocks.

* * * * *